J. IRVINE.
Harvester Rakes.

No. 142,632. Patented September 9, 1873.

Witnesses.
Chas. Nida.
Sedgwick

Inventor.
J. Irvine
Per
Attorneys.

UNITED STATES PATENT OFFICE.

JAMES IRVINE, OF PARKERSBURG, IOWA.

IMPROVEMENT IN HARVESTER-RAKES.

Specification forming part of Letters Patent No. 142,632, dated September 9, 1873; application filed August 4, 1873.

*To all whom it may concern:*

Figure 1:
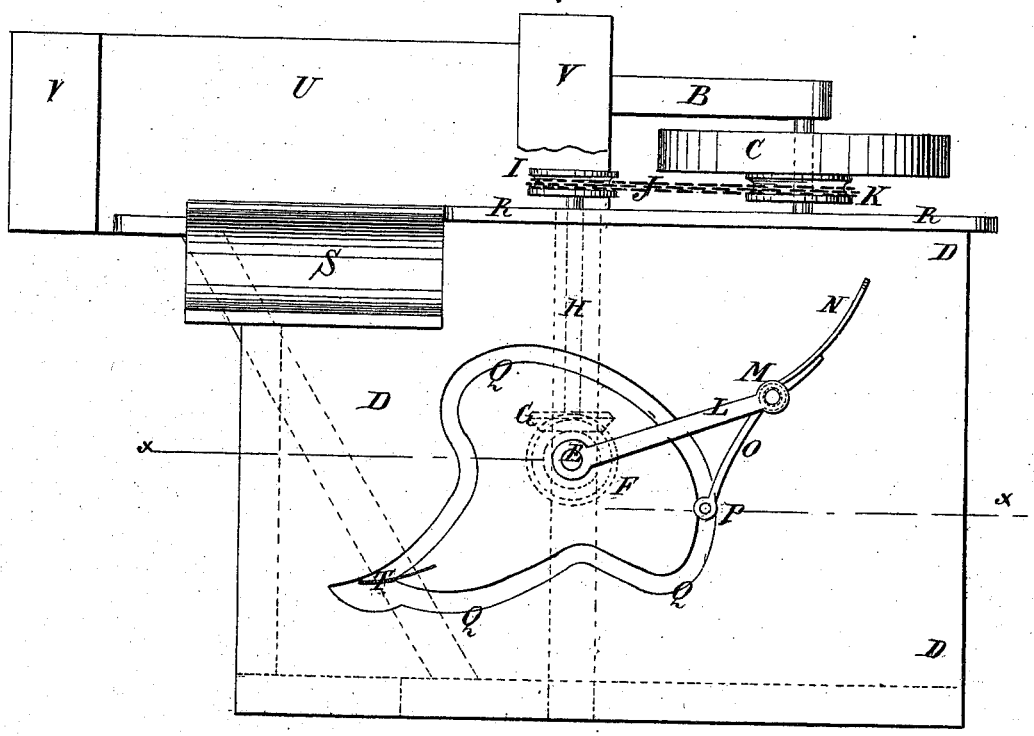
Figure 2:
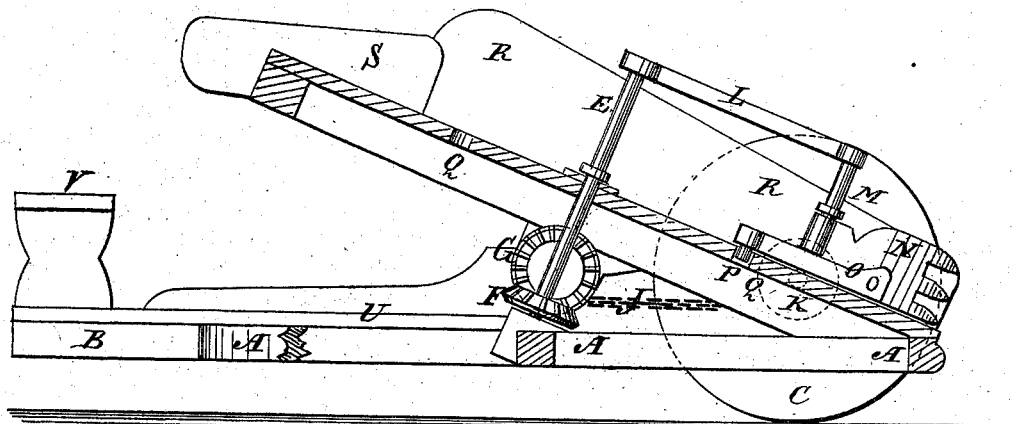

Be it known that I, JAMES IRVINE, of Parkersburg, in the county of Butler and State of Iowa, have invented a new and useful Improvement in Elevating-Rake for Reapers and Mowers, of which the following is a specification:

Figure 1 is a top view of my improved attachment, shown as applied to a reaper-platform. Fig. 2 is a vertical longitudinal section of the same taken through the line $x\ x$, Fig. 1.

Similar letters of reference indicate corresponding parts.

My invention has for its object to furnish an improved elevating-rake for attachment to reapers and mowers to convert them into harvesters, and which shall be simple in construction, conveniently applied, and effective in operation. The invention consists in the inclined platform having the peculiarly-shaped groove, provided with a spring-gate formed in it, in combination with the frame-work of a reaper or mower; and in the rigid arms, the pivoted rake, the spring-bar, and the guide-pin, in combination with the grooved platform, provided with a spring-gate and with gearing for connecting them with the drive-wheel of the reaper or mower, as hereinafter fully described.

A represents the platform, B a part of the frame, and C the drive-wheel, of an ordinary reaper. D is a platform attached to the frame-work A B of the reaper, and extending upward and rearward from the cutter-bar, and to the middle part of which, and at right angles with its plane, is pivoted a shaft, E. To the lower end of the shaft E is attached a bevel-gear wheel, F, the teeth of which mesh into the teeth of the bevel-gear wheel G attached to the inner end of the horizontal shaft H, which revolves in bearings in the frame-work A B, and to the outer end of which is attached a chain-wheel, I. Around the wheel or pulley I passes an endless chain, J, which also passes around a wheel or pulley, K, rigidly connected with the drive-wheel C, so that the shaft E may be revolved by and from the said drive-wheel C. To the upper end of the shaft E is rigidly attached an arm, L, which projects at right angles with said shaft, so as to be parallel with the platform D. To the outer end of the arm L is rigidly attached an arm, M, projecting downward at right angles with the arm L, so as to be at right angles with the platform D, and reaching nearly to said platform. To the lower end of the arm M is pivoted the rake N. To the rake N is secured the end of a spring-bar, O, which rests against the lower part of the arm L; and to its other end is attached a pin, P, which enters a guide-groove, Q, in the platform D, which groove Q is so formed that, as the shaft E revolves, the rake N will sweep across the lower part of the platform D parallel, or nearly so, with the cutter-bar, so as to collect the cut grain, and gather it into a gavel against the side board R attached to the inner edge of the said platform D. As the shaft E continues to revolve, the rake N slides the gavel back along the side board R, the spring O allowing the rake N to accommodate itself to the size of the gavel. As the gavel approaches the rear inner corner of the platform D it is pushed into a trough, S, attached to said corner. As the rake N passes the end of the trough S the guide-pin P enters a sharp angle in the guide-groove Q which swings the rake N around, so that it may move forward along the outer part of the platform D into proper position to collect another gavel.

T is a small spring-gate placed in the groove Q just in front of the sharp angle in said groove, which spring is pushed back by the pin P, and serves the double purpose of guiding said pin fully into the said sharp angle, and preventing it from leaving said angle by the route by which it entered it.

The gavels are removed from the trough S by binders standing upon the platform U, and are laid to be bound upon the tables V at the front and rear ends of said platform.

Having thus described my invention, I claim as new and desire to secure by Letters Patent—

1. The inclined platform D, having the peculiarly-shaped groove Q, provided with a spring-gate, T, formed in it, substantially as herein shown and described.

2. The rigid arms L M, pivoted rake N, spring-bar O, and guide-pin P, in combination with the platform D, having groove Q and gate T, and with gearing for connecting them with the drive-wheel C, substantially as herein shown and described.

JAMES IRVINE.

Witnesses:
 HIRAM GOODSELL,
 WILLIAM M. THOMPSON.